UNITED STATES PATENT OFFICE.

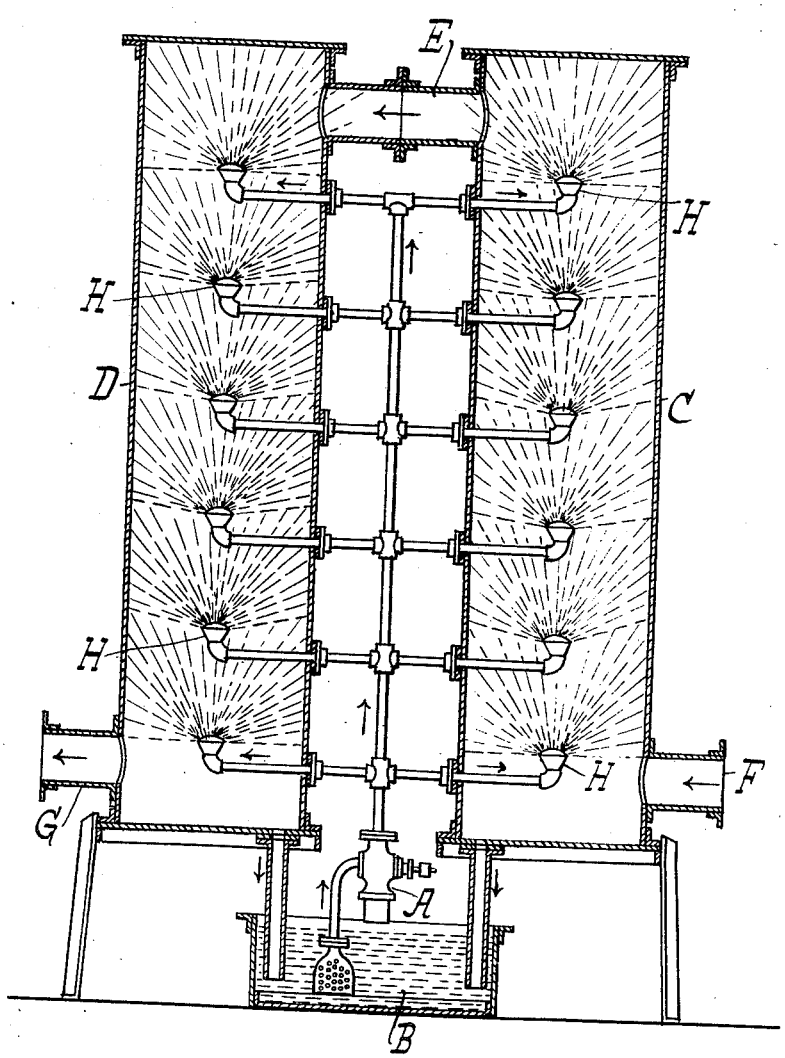

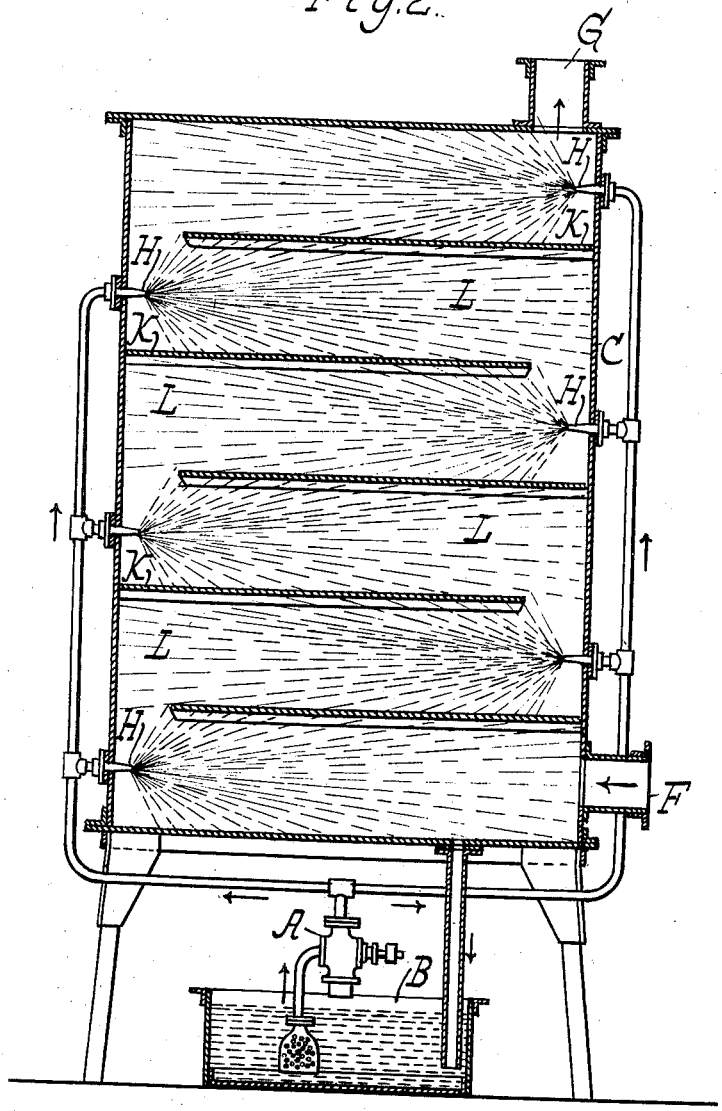

CARL BOSCH AND HANS KELLER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

PROCESS OF ABSORBING OXIDS OF NITROGEN.

1,029,528.  Specification of Letters Patent.  Patented June 11, 1912.

Application filed June 22, 1909. Serial No. 503,637.

*To all whom it may concern:*

Be it known that we, CARL BOSCH and HANS KELLER, doctors of philosophy and chemists, subjects of the King of Prussia, residing at Ludwigshafen-on-the-Rhine, Germany, have invented new and useful Improvements in Processes of Absorbing Oxids of Nitrogen, of which the following is a specification.

Our invention relates to the absorption of oxids of nitrogen. The absorption of oxids of nitrogen from mixtures containing them (particularly from mixtures obtained by passing air through an electric arc flame) by passing the gases up a tower packed with material down which passes a suspension of a base is open to the objection that the spaces between the packing material gradually become filled with muddy deposit which renders effective absorption difficult and finally chokes up the tower.

According to our invention the absorption of oxids of nitrogen by means of a suspension of a base, or of a basic substance, is effected by introducing a suspension of an absorbent into the gas mixture in a state of fine division, for instance as a spray, or mist. The results obtained thereby are very satisfactory, the gases being better absorbed than they are according to the first-mentioned process, and the process according to our invention being capable of being worked continuously without interruption. In spite of the large quantities of gases which have to be treated, the apparatus required for the purposes of this invention is comparatively small, and less power is required to keep the gases in circulation than is required for the first-named process. As bases which are particularly suitable for use according to this invention, we mention the oxids, hydroxids, and carbonates of the alkaline earth metals and of magnesium. Particularly good results are obtained when using milk of lime.

Of course the process of our invention can be used either for the absorption of the whole quantity of oxids of nitrogen contained in the gases leaving the electric arc flame, or for absorbing the nitrogenous compounds which remain in the gases after they have been partially treated for absorption, for instance after they have been treated with water for the production of nitric acid.

The process of this invention can be carried out in very many different methods without departing from the nature of our invention. For instance, the absorption can be carried out in towers, or in apparatus of any other suitable shape, such for instance as in a number of tubes through which the gases pass in series, or if the tubes be sufficiently large they may be arranged in parallel. If desired, other shaped vessels can be employed. Then again, the suspension of the absorbing agent can be introduced into the apparatus in any suitable manner. As instances of methods which can be used according to our invention, but without in any way limiting ourselves to the methods which we quote here, we mention that the absorbing agent can be introduced through any suitable spraying nozzle, and it can be forced into the apparatus, if desired, by means of compressed air, or, instead of compressed air, the gases containing the oxids of nitrogen can themselves be employed for assisting in the introduction and spreading out into a state of fine division of the absorbing agent.

Instead of using compressed air, or the nitrous gases themselves, other methods can be employed, for instance, the suspension can be made to enter the apparatus by means of its own weight, or it can be forced in by mechanical means. The method of causing the entering, or entered, suspension to assume a state of fine division can also be varied in any suitable manner. For instance, suitable nozzles can be employed, either one, or, preferably, more, in each piece of apparatus. The nozzles may allow only the absorbent suspension to enter, or they may be such that at the same time air, or other gas, enters and assists in spreading out the suspension. The nozzles may remain stationary, or they may have motion imparted to them. If desired, the suspension can enter through the nozzle in the form of a jet and then be subsequently spread out, for instance by causing it to impinge on a suitable surface, either stationary, or in motion, or in any other suitable manner. The gases, containing, for instance two per cent. of nitric oxid, can be passed into the tower, or other apparatus, either at the top, or at the bottom, or at any other suitable point, or points, and at the same time the suspension, for instance, milk of lime of six degrees Baumé, is passed into the apparatus in any suitable manner, such for instance as hereinbefore described. In this manner an absorption of from ninety-eight, to ninety-nine, per cent. of the nitric oxid can easily be effected.

The drawings accompanying this specification represent in vertical section two forms of apparatus suitable for carrying out the process of this invention.

In Fig. 1 C, D represent two towers joined together at the top by the pipe E, the gases enter at the bottom of the tower C, through the opening F, and leave the lower end of the tower D, through the opening G. H H represent suitable nozzles through which the milk of lime is sprayed into the towers, there being several such nozzles in each tower, as represented in the drawing. The milk of lime flows down to the lower end of each tower and through an outlet into the tank B and is thence raised by means of the pump A and again forced through the nozzles H H in the form of spray. This is repeated until the milk of lime has absorbed sufficient of the oxids of nitrogen.

In Fig. 2 the gases are made to pass in a zig-zag manner along passages L L which are formed in the tower C by means of partitions K K, arranged after the manner of baffle plates. At the end of each such partition a nozzle H is situated through which milk of lime is sprayed into the space between the partition or the like. In this case the gases enter at the lower end of the tower C and leave at the top, while the milk of lime after being used flows into the tank B and is raised again by the pump A and forced through the nozzles afresh.

A very suitable form of apparatus for use in carrying out the process of our invention consists of a series of tubes or passages arranged in a manner somewhat similar to that shown in Fig. 2, in which the gases are caused to pass through the series of tubes or passages in a zig-zag direction, that is to say, along one passage and then back again in the opposite direction along the next passage, and so on, while at the end of each such tube or passage a nozzle for spraying in the milk of lime is situated. The tubes or passages can be placed side by side, and also one above the other so that they take up a minimum of space. In any case the milk of lime can be sprayed into the tube or passage, either in the direction of motion of the gases or in the opposite direction, as shown in Fig. 2, or any other convenient means of spraying can be followed.

Now what we claim is:—

1. The process of absorbing oxids of nitrogen from mixtures containing them, by introducing a suspension of an absorbent into the gas mixture in a state of fine division.

2. The process of absorbing oxids of nitrogen from mixtures containing them, by introducing milk of lime in a state of fine division into the gas mixture.

3. The process of absorbing oxids of nitrogen from mixtures containing them, by spraying milk of lime into the gas mixture.

In testimony whereof we have hereunto set our hands in the presence of two subscribing witnesses.

CARL BOSCH.
HANS KELLER.

Witnesses:
ERNEST F. EHRHARDT,
J. ALEC. LLOYD.